US006975433B2

(12) United States Patent
Agano

(10) Patent No.: US 6,975,433 B2
(45) Date of Patent: Dec. 13, 2005

(54) METHOD AND APPARATUS FOR READING IMAGE INFORMATION

(75) Inventor: Toshitaka Agano, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 755 days.

(21) Appl. No.: 09/822,518

(22) Filed: Apr. 2, 2001

(65) Prior Publication Data

US 2002/0051250 A1 May 2, 2002

(30) Foreign Application Priority Data

Mar. 31, 2000 (JP) ............................ 2000-098725

(51) Int. Cl.[7] ........................... H04N 1/40; H04N 1/46; H04N 1/04; G06K 9/38

(52) U.S. Cl. ...................... 358/445; 358/446; 358/447; 358/461; 358/463; 358/504; 358/475; 358/509; 382/270; 382/273

(58) Field of Search ................................ 358/482, 483, 358/445, 446, 475, 463, 447, 461, 504, 509; 382/270, 273

(56) References Cited

U.S. PATENT DOCUMENTS

| | | | | | |
|---|---|---|---|---|---|
| 4,803,359 | A | | 2/1989 | Hosoi et al. | 250/327.2 |
| 4,982,232 | A | * | 1/1991 | Naito | 399/51 |
| 5,223,954 | A | * | 6/1993 | Miyakawa et al. | 358/474 |
| 5,726,771 | A | * | 3/1998 | Gann et al. | 358/445 |
| 5,991,010 | A | * | 11/1999 | Nishio | 355/82 |

FOREIGN PATENT DOCUMENTS

| | | | |
|---|---|---|---|
| EP | 0 898 421 A2 | 2/1999 | H04N 5/30 |
| JP | 59-211263 | 11/1984 | H01L 27/14 |
| JP | 1-216290 | 8/1989 | G01T 1/24 |
| JP | 2-164067 | 6/1990 | H01L 27/146 |
| JP | 9-222114 | 8/1997 | F16B 47/00 |
| WO | 92/06501 | 4/1992 | H01L 27/14 |

OTHER PUBLICATIONS

Material Parameters In Thick Hydrogenated Amorphous Silicon Radiation Detectors, University of California, Berkeley.

IEEE, vol. 36, No. 2, Apr. 1989, Metal/Amorphous Silicon Multilayer Radiation Detectors, Yujiro Naruse and Tamotsu Hatayama.

Abstract, 02-164067, Jun. 25, 1960.

Abstract, 01-216290, Aug. 30, 1989.

* cited by examiner

*Primary Examiner*—Edward Coles
*Assistant Examiner*—Houshang Safaipour
(74) *Attorney, Agent, or Firm*—Sughrue Mion, PLLC

(57) ABSTRACT

An image information reading apparatus that can obtain high quality images without an effect of noise and a photographing condition or the like is realized even in the case where a low-bit A/D converter is used. The apparatus comprises control means for switching between pre-reading to main reading, characteristic determination means for determining, by analyzing an electric signal obtained by the pre-reading, a normalization processing characteristic used in normalization processing on an electric signal obtained by the main reading, and normalization processing means for carrying out the normalization processing on the electric signal in the main reading according to the determined normalization processing characteristic. The characteristic determination means analyzes image data by using a cumulative histogram of pre-reading data, and determines the normalization processing characteristic so that an image represented by the image data has adequate density and contrast.

23 Claims, 5 Drawing Sheets

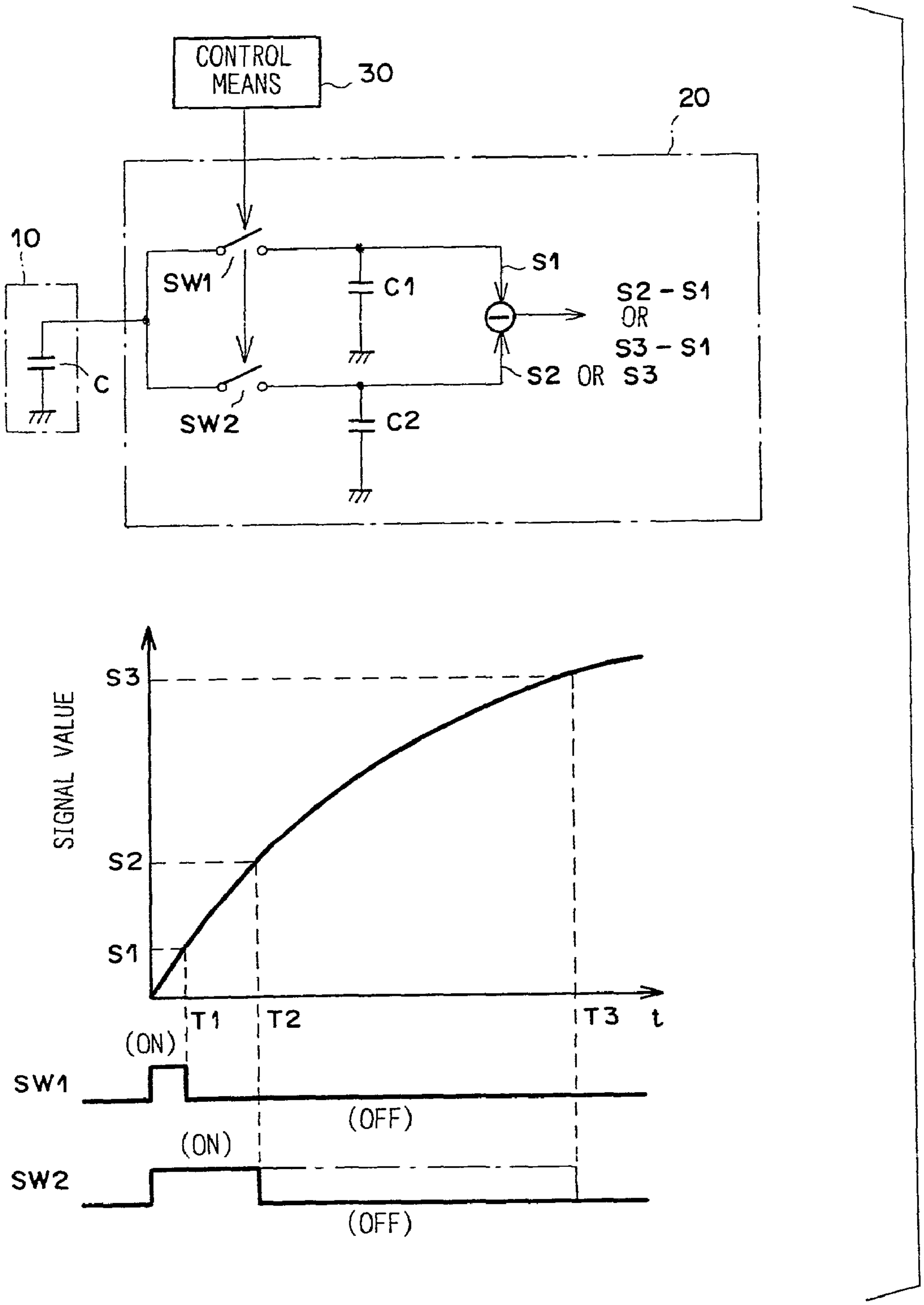
F I G. 2

| | IN PRE-READING | IN MAIN READING | CONDITION |
|---|---|---|---|
| INTENSITY P OF READING LIGHT L1 | P1 | P2 | P1<P2 |
| SCANNING SPEED V OF READING LIGHT L1 | V1 | V2 | V1>V2 |

| | IN PRE-READING | IN MAIN READING |
|---|---|---|
| READING LIGHT SCANNING OPTICAL SYSTEM 40 | × | ○ |
| UNIFORM EXPOSURE OPTICAL SYSTEM 45 | ○ | × |

○ : WORKING
× : NOT WORKING

METHOD AND APPARATUS FOR READING IMAGE INFORMATION

BACKGROUND OF THE INVENTION

1. Field of the Invention

The present invention relates to an image information reading method and an image information reading apparatus. More specifically, the present invention relates to a method and an apparatus for reading image information by using a solid-state image detector having a semiconductor in a main part thereof.

2. Description of the Related Art

In medical radiography aimed at medical diagnoses, radiation image information reading apparatus using radiography films or stimulable phosphor sheets have been known.

In medical radiography, various kinds of radiation image recording and reading apparatus using solid-state radiation detectors have also been proposed and put into practice. In a solid-state radiation detector, an electric charge obtained by detecting radiation is stored in a capacitor of a detection device and the electric charge is output by being converted into an electric signal representing radiation information. As a solid-state radiation detector used in such apparatus, various types have been proposed. With respect to an electric charge generating process in which radiation is converted into an electric charge, solid-state radiation detectors employing an optical conversion method and a direct conversion method are available. With respect to an electric charge reading process in which an electric charge stored in a detector is read, solid-state radiation detectors are classified into TFT (Thin Film Transistor) reading type detectors and optical reading type detectors.

An optical conversion type detector comprises a solid-state detecting unit (an image reading unit) having a plurality of photoelectric conversion devices formed on an insulating substrate and phosphor formed on the solid-state detecting unit. In a detector of this type, the photoelectric conversion devices detect light emitted from the phosphor by exposing the phosphor to radiation, and a signal electric charge thereby obtained is stored in capacitors of the detector. The stored electric charge is then converted into an electric signal and the signal is output (see Japanese Unexamined Patent Publication Nos. 59(1984)-211263 and 2(1990)-164067, PCT International Publication No. WO92/06501, and SPIE Vol. 1443 Medical Imaging V; Image Physics (1991), p. 108–119, for example).

A direct conversion type detector comprises a solid-state radiation detecting unit having a plurality of electric charge collecting electrodes formed on an insulating substrate and layers of radiation-conductive material formed on the charge collecting electrodes and generating an electric charge representing radiation information by being exposed to radiation. In a detector of direct conversion type, the signal electric charge generated within the radiation-conductive material by exposing the material to radiation is collected by the electric charge collecting electrodes and stored in capacitors. The stored electric charge is then converted into an electric signal, and the signal is output (see MATERIAL PARAMETERS IN THICK HYDROGENATED AMORPHOUS SILICON RADIATION DETECTORS, Lawrence Berkeley Laboratory. University of California, Berkeley, Calif. 94720 Xerox Parc. Palo Alto. Calif. 94304, Metal/Amorphous Silicon Multilayer Radiation Detectors, IEEE TRANSACTIONS ON NUCLEAR SCIENCE. VOL. 36. NO.2. APRIL 1989, and Japanese Unexamined Patent Publication No. 1(1989)-216290, for example). The electric charge collecting electrodes and the radiation-conductive material comprise a main part of solid-state detecting devices using the direct conversion method.

In the TFT reading method regarding the electric charge reading process, a signal electric charge stored in capacitors is read while switches such as TFTs set on a signal line connected to the capacitors of detecting devices are turned on in a scanning manner. The optical conversion type detectors and the direct conversion type detectors generally use this method. The switches can take other forms, although TFTs are generally used.

On the other hand, the optical reading method is a method of reading a signal electric charge stored in a capacitor by irradiating light for reading (an electromagnetic wave for reading) on a solid-state detecting device. A portion of direct conversion type detectors uses this reading method with respect to the charge generating process.

The applicant has proposed a solid-state radiation detector by improving a direct conversion type radiation detector (see Japanese Patent Application No. 9(1997)-222114).

The radiation detector of improved direct conversion type comprises a first conductive layer which is transparent to radiation for recording, a photoconductive layer for recording exhibiting conductivity when receiving the radiation for recording which has passed through the first conductive layer, an electric charge transport layer which acts substantially as an insulator to an electric charge having the same polarity as an electric charge charged in the first conductive layer while acting substantially as a conductor to an electric charge having the reverse polarity, a photoconductive layer for reading exhibiting conductivity when receiving an electromagnetic wave for reading, and a second conductive layer which is transparent to the electromagnetic wave for reading, with these layers being disposed in this order. A latent image electric charge representing image information is stored at the interface between the photoconductive layer for recording and the electric charge transport layer. This detector employs the direct conversion method with respect to the electric charge generating process and the optical reading method with respect to the electric charge reading process.

As methods of reading the latent image charge in a solid-state radiation detector using the improved direct conversion method, the following methods are known. For example, a flat shape is adopted for the second conductive layer (reading electrode), and the latent image electric charge is detected by scanning the reading electrode with spot-like reading light such as a laser beam. Alternatively, an electrode in a comb-like shape (stripe electrode) is used as the reading electrode and a linear light source elongated along the direction almost orthogonal to the longitudinal direction of the stripe electrode scans the stripe electrode longitudinally to detect the latent image charge.

However, since the radiation detectors of any methods described above have a limit in a maximum electric charge (saturation charge) that can be stored or read, an A/D conversion range for digitizing the image signal is set narrow. Therefore, a saturation level of the signal is lower than in an apparatus using a conventional radiography film or a stimulable phosphor sheet, and a dynamic range thereof is also small. When image data obtained by digitizing the image signal output from the solid-state detecting devices are visualized, density and contrast of the image do not necessarily become adequate. As a result, quality of a radiation image obtained in this manner is lower than a radiation image obtained by an apparatus using a conventional radiography film or the like.

For example, at the time of low radiation dose photographing, the signal range becomes small and the signal cannot be used to a full accuracy of A/D conversion. Therefore, bit resolution becomes lower and quantization noise becomes conspicuous. Furthermore, noise caused by an electric system such as a detector or a recording and reading apparatus becomes large, and an S/N ratio decreases.

Moreover, since the A/D conversion range cannot be set in accordance with the image signal range, a high-bit A/D converter is necessary for an adequate bit resolution in both low radiation dose photographing and high radiation dose photographing.

SUMMARY OF THE INVENTION

The present invention has been conceived based on consideration of the above problems. An object of the present invention is therefore to provide an image information reading method and an image information reading apparatus that do not cause quality degradation in a reproduced image, regardless of a low-bit A/D converter or a dose of radiation irradiated on an image detector (on a solid-state detecting device, more specifically).

An image information reading method of the present invention is a method of reading image information by using an image detector enabling recording of the image information by storing an electric charge obtained by detecting an electromagnetic wave representing the image information. In this image information reading method, main reading is carried out for reading the image information by obtaining an electric signal in accordance with an amount of the electric charge stored in the image detector, and the image information reading method comprises the steps of:

carrying out pre-reading prior to the main reading;

analyzing the electric signal obtained by the pre-reading;

determining a normalization processing characteristic used for carrying out normalization processing on the electric signal obtained by the main reading; and carrying out the normalization processing on the electric signal obtained by the main reading, based on the normalization processing characteristic that has been determined.

The "normalization processing" is signal processing to cause the image signal obtained by the main reading to correspond to an adequate input signal range of an image reproducing apparatus or the like so that the density or contrast of an image based on the electric signal in accordance with the amount of the electric charge stored in the image detector becomes adequate. More specifically, the normalization processing is processing to convert the image signal obtained by the detector into an image signal input to the image reproducing apparatus or the like in such a manner that a maximum signal level and a minimum signal level of a desired image information range in the image signal correspond to a maximum value and a minimum value of an adequate density range in a visible output image, respectively. It is preferable for the normalization processing to include processing to reduce the number of bits.

When the normalization processing characteristic is determined, image data range determination means is preferably used for determining a desired image data range as a range of image data representing a desired portion of the image information. In this case, the normalization processing characteristic is determined by analyzing the image data in the desired image data range determined by the image data range determination means, as has been proposed by the applicant. in Japanese Patent Application No. 11(1999)-218277.

In order to determine the desired image data range, any method can be used as long as the range of image data representing the desired image information portion can be determined. For example, in the case where image information in a radiation field is used as the desired image information portion, radiation field detecting means adopting various kinds of radiation field recognition processing maybe used so that image data in a detected radiation field can be used as the desired image data range. As such radiation field recognition processing, a dynamic contour extraction processing such as Snake's algorithm, contour extraction processing using Huff conversion, and a method of recognizing a radiation field as a field surrounded by a line having contour points found on a contour of the radiation field may be used, as has been described in Japanese Unexamined Patent Publication Nos. 61(1986)-39039, 61(1986)-170178, 63(1988)-259538. Alternatively, as has been described in Japanese Unexamined Patent Publication No. 4(1992)-11242, only an image of a subject is used as the desired image information portion, and means for detecting an edge of the subject image may be used. Data corresponding to an area within the edge is used as the desired image data range. Alternatively, as has been described in Japanese Unexamined Patent Publication No. 1(1989)-50171, a cervical vertebra portion and a soft tissue portion or the like of a subject image are used as the desired image information portion for example, and means for detecting the cervical vertebra portion and the soft tissue portion may be used. Based on a result of detection, the desired image data range is determined.

Furthermore, as has been proposed in Japanese Patent Application No. 11(1999)-218277, it is preferable for the normalization processing characteristic to be determined based on consideration of a saturation characteristic of the solid-state detecting device comprising the image detector. The "saturation characteristic of the solid-state detecting device" refers to information on saturation of the solid-state detecting device, such as position information of a saturated pixel in an image or a ratio of saturated pixels to all pixels.

When the pre-reading is carried out as has been described above in the image information reading method of the present invention in order to determine the normalization processing characteristic, the amount of signal electric charge at the time of the main reading is reduced by the pre-reading and an S/N ratio may decrease in the main reading. Therefore, it is preferable for a reduction in the amount of signal electric charge caused by the pre-reading to be suppressed to such a degree that does not cause degradation of the S/N ratio in a main-reading image. Therefore, the reduction is suppressed to equal to or less than 30%, preferably to equal to or less than 10%.

In order to cause the reduction to be equal to or less than 30%, a method below may be adopted, depending on the type of detector. First, in the case where an optical reading type detector is used as the image detector, it is preferable for the pre-reading to be carried out by using reading light whose irradiation energy per unit area of the detector is smaller than irradiation energy thereof at the time of the main reading. In order to lower the irradiation energy, irradiation intensity of the reading light may be reduced. Alternatively, a scanning speed of the reading light maybe increased. Moreover, the pre-reading maybe carried out by using reading light enabling irradiation on an entire surface of the detector at once. In this case, processing time for the pre-reading is also reduced.

Meanwhile, if a TFT reading type detector is used as the image detector in the image information reading method of the present invention, the pre-reading is carried out by reducing ON time of TFTs in the pre-reading compared to the ON time in the main reading, in order to cause the reduction to be equal to or less than 30% in the main reading.

In the image information reading method of the present invention, it is preferable for the pre-reading to be carried out by binning reading if a TFT reading type detector is used as the image detector.

An image information reading apparatus of the present invention is an apparatus for carrying out the image information reading method of the present invention. In other words, the image information reading apparatus comprises an image detector enabling recording of image information by storing an electric charge obtained by detecting an electromagnetic wave representing the image information, and signal acquisition means for obtaining an electric signal in accordance with an amount of the electric charge stored in the image detector. The image information reading apparatus further comprises:

control means for controlling switching between main reading in which the image information is read and pre-reading for obtaining the electric signal carried out prior to the main reading;

characteristic determination means for determining a normalization processing characteristic used at the time of carrying out normalization processing on the electric signal obtained by the main reading, by analyzing the electric signal obtained by the pre-reading; and normalization processing means for carrying out the normalization processing on the electric signal obtained by the main reading, based on the normalization processing characteristic that has been determined.

In the image information reading apparatus of the present invention, it is preferable for the control means to control a reduction in the electric signal in the main reading caused by the pre-reading to be equal to or less than 30%. More preferably, the reduction is equal to or less than 10%.

In the case where the image detector of the image information reading apparatus of the present invention is an optical reading type detector, it is preferable for the control means to cause the pre-reading to be carried out by using reading light whose irradiation energy per unit area of the detector is smaller than in the main reading.

More specifically, the control means may lower the irradiation energy by reducing irradiation intensity of the reading light or by increasing a scanning speed of the reading light.

In the case where the image detector in the image information reading apparatus of the present invention is an image detector of optical reading type, it is preferable for the control means to cause the pre-reading to be carried out by using reading light irradiating over an entire surface of the detector at once.

In the case where the image detector in the image information reading apparatus of the present invention is an image detector of TFT reading type, it is preferable for the control means to cause the pre-reading to be carried out by causing ON time of TFTs in the pre-reading to become shorter than in the main reading. Alternatively, the control means may cause the pre-reading to be carried out by using binning reading.

According to the image information reading method and the image information reading apparatus of the present invention, the pre-reading is carried out prior to the main reading. By analyzing the electric signal obtained by the pre-reading, the normalization processing characteristic to be used for the normalization processing is determined. Based on the normalization processing characteristic that has been determined, the normalization processing is carried out on the electric signal obtained by the main reading. Therefore, a setting condition such as an optimal gain or offset (normalization processing) in the main reading can be determined from data obtained by the pre-reading. As a result, a low-bit A/D converter can be used. Furthermore, image quality degradation can be prevented, since the effects of noise are suppressed.

Moreover, since the normalization processing characteristic is determined in advance by carrying out the pre-reading, time from the main reading to image reproduction can be reduced compared to the case of determining the normalization processing characteristic after the main reading.

When the pre-reading is carried out in the image information reading method of the present invention in order to determine the normalization processing characteristic, the amount of the signal electric charge in the main reading is reduced by the pre-reading and the S/N ratio of the main-reading image may be reduced. However, by causing the reduction to be equal to or less than 30%, preferably equal to or less than 10%, the S/N ratio reduction can be suppressed.

In the case where the image detector is of optical reading type, the pre-reading is carried out by using the reading light enabling irradiation over the entire surface of the detector at once. In the case where the image detector is of TFT reading type, the pre-reading is carried out by binning reading. In this manner, processing time for the pre-reading can be reduced in either case.

BRIEF DESCRIPTION OF THE DRAWINGS

FIG. 2 shows a relationship between image signals obtained at the time of pre-reading and main reading in a TFT reading method;

FIGS. 3A~3C show a method of determining a normalization processing characteristic, wherein FIG. 3A shows cumulative histogram examples, FIG. 3B shows cumulative histograms converted to an adequate density range, and FIG. 3C shows conversion function examples;

DESCRIPTION OF THE PREFERRED EMBODIMENT

Hereinafter, an embodiment of the present invention will be explained with reference to the accompanying drawings.

Figure 1:
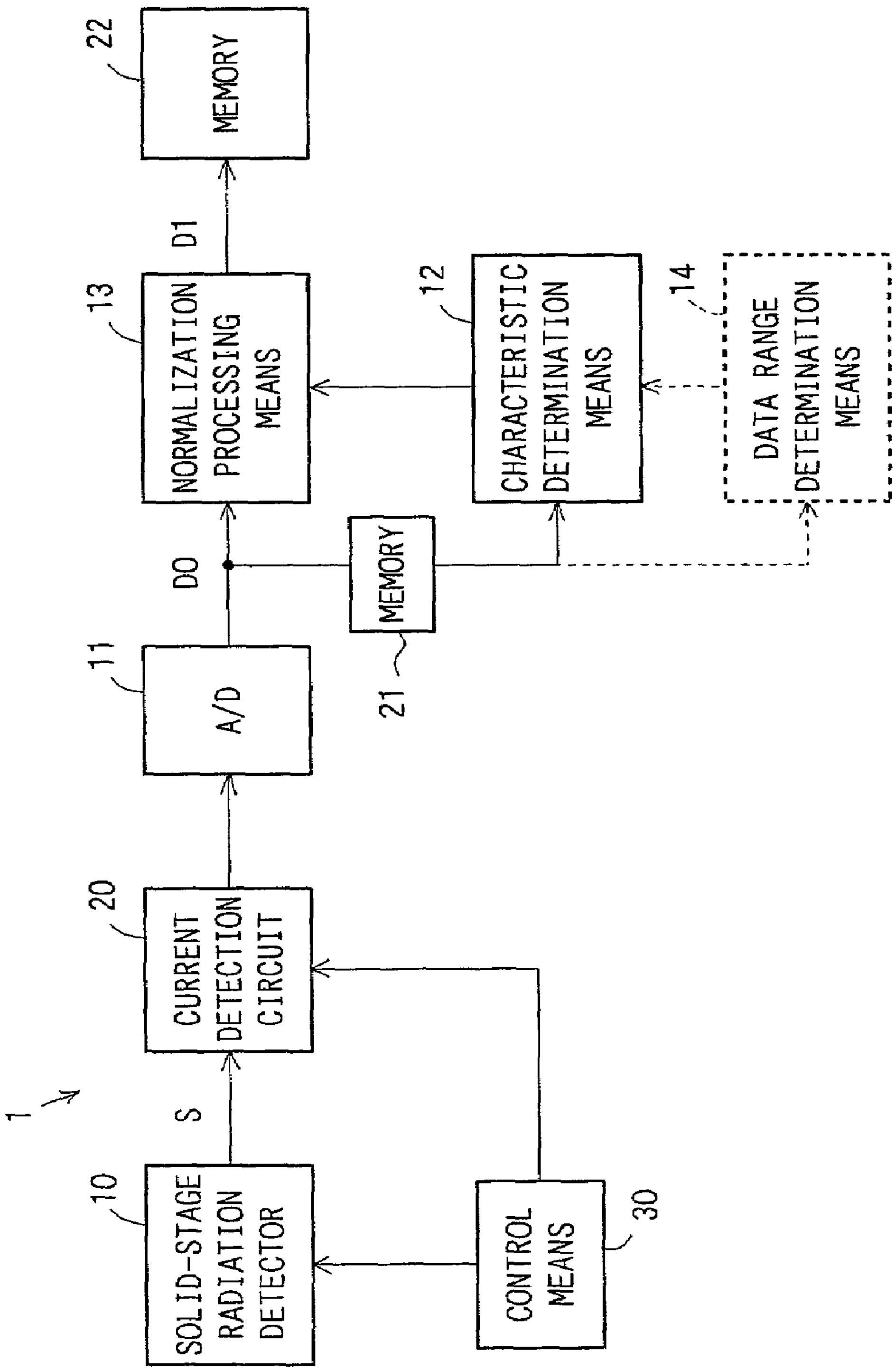
FIG. 1 is a block diagram showing a configuration of an image information reading apparatus as an embodiment of the present invention.

FIG. 1 is a block diagram showing a configuration of the embodiment of an image information reading apparatus of the present invention.

As shown in FIG. 1, an image information reading apparatus 1 comprises a solid-state radiation detector 10 having a plurality of solid-state detecting devices laid out two-dimensionally (not shown) for detecting radiation representing image information obtained by photographing and for converting the radiation into an image signal, a current detection circuit 20 as image signal acquisition means for obtaining an electric signal in accordance with an amount of a latent image charge representing the image information stored in the solid-state radiation detector 10, an A/D converter 11 for converting an image signal S output from the current detection circuit 20 into digitized image data D0, a memory 21 for temporarily storing the image data D0, characteristic determination means 12 for determining, by analyzing the image data D0*a* read from the memory 21, a normalization processing characteristic used for normalization processing on image data D0 obtained by main reading, normalization processing means 13 for outputting processed image data D1 by carrying out, based on the normalization processing characteristic determined by the characteristic determination means 12, the normalization processing on the image data D0 obtained by the main reading, and a memory 22 for storing the image data D1 output from the normalization processing means 13. Data range determination means 14 shown by a dashed line in FIG. 1 may also be used. The image data D1 output from the normalization processing means 13 and stored in the memory 22 are input to a radiation image reproducing apparatus not shown in FIG. 1. After predetermined image processing is carried out on the image data D1, the image data D1 are displayed as a visible image on an image display apparatus such as a CRT display.

As the solid-state radiation detector 10, a solid-state radiation detector of optical reading type, direct conversion type or improved direct conversion type may be used. In the case where an optical reading type detector is used as the radiation detector 10, an optical system for scanning the detector by reading light is used. The current detection circuit 20 may be unified with the detector 10. For example, in the case of the detector 10 of TFT reading type, the current detection circuit 20 is generally unified with the detector.

The image information reading apparatus 1 further comprises control means 30 for switching from pre-reading to main reading and vise versa. Depending on the detector 10 to be used, ON/OFF control of TFTs, a scanning speed of reading light, and irradiation intensity or an irradiation method can be controlled by the control means 30.

Operation of the image information reading apparatus 1 having the above configuration 1 will be explained next. First, the case of not using the data range determination means 14 shown by the dashed line in FIG. 1 will be explained, with a TFT reading type detector being used as the detector 10.

After a radiation image is recorded as an electrostatic latent image in the detector 10, a pre-reading image signal Sa is obtained by carrying out pre-reading prior to main reading.

When pre-reading is carried out, an image signal component is reduced thereby at the time of main reading. Therefore, it is preferable for this reduction to be kept minimal. The reduction per pixel is set at equal to or less than 30%. Preferably, the reduction is set equal to or less than 10%. The reduction is used as the pre-reading image signal Sa in the normalization processing as will be explained later. The pre-reading image signal equal to approximately 10% or slightly more is sufficient for the normalization processing.

FIG. 2 shows a relationship between image signals at the time of pre-reading and main reading in a TFT reading method. When the radiation image is recorded as the electrostatic latent image in the detector 10, the electric charge representing the image information is stored in a capacitor C as a charge storing unit. As methods of reading the image information stored in the detector 10, various methods can be used. In this embodiment, a configuration having two sample and hold capacitors C1 and C2 is used for enabling reduction in switching noise of an integrating amplifier, as described in U.S. Pat. No. 5,648,660. Other configurations can also be used.

In the case of the configuration described in U.S. Pat. No. 5,648,660, a voltage difference caused by transporting the electric charge to the capacitors C1 and C2 is used as the image signal. First, SW1 and SW2 become ON at approximately the same time, and SW1 becomes OFF after time T1 (short time) has elapsed. In this manner, a terminal voltage of the capacitor C1 is sampled and held. After a predetermined time has elapsed, SW2 becomes OFF and a terminal voltage of the capacitor C2 is sampled and held. The difference between values of the terminal voltages of the capacitors held as the samples is the image signal.

Therefore, when pre-reading is carried out, SW2 becomes OFF at time T2 whose time lag from the time SW1 becomes OFF is comparatively short. Meanwhile, at the time of main reading, SW2 becomes OFF at time T3 whose time lag from the time SW1 becomes OFF is comparatively long. Let a signal value S1 be a signal value obtained when SW1 becomes OFF at the time T1, and let a signal value S2 be a signal value obtained when SW2 becomes OFF at the time T2. Let a signal value obtained when SW2 becomes OFF at the time T3 be S3. A reduction Sd can be expressed by an equation (S2−S1)/(S3−S1). Therefore, the times T2 and T3 are adjusted so that the reduction becomes 30% or less, preferably 10% or less.

The detector 10 of the TFT reading type has TFTs for reading at every other pixel. A plurality of the TFTs can generally become ON at the same time. Therefore, in order to reduce time for pre-reading, so-called binning reading is carried out. In binning reading, neighboring TFTs over several pixels become ON at the same time, and a signal for the pixels is read collectively. When binning reading is carried out, an image resolution decreases since the signal is read collectively for the pixels. However, a value of the signal becomes larger. The image resolution does not cause a problem in normalization processing. On the contrary, the number of data items decreases and the effect of noise is also suppressed due to the large signal value, which is convenient.

The control means 30 instructs setting of the times T2 and T3 for controlling the reduction, and controls binning reading.

The pre-reading image signal Sa detected by the solid-state radiation detector 10 is input to the A/D converter 11, and converted into 16-bit digital image data D0*a*. The image data D0*a* are input to the characteristic determination means 12 after being stored temporarily in the memory 21. The normalization processing means 13 determines the normalization processing characteristic used for the subsequent normalization processing on the data obtained in main reading.

FIG. 3 shows how the normalization processing characteristic is determined. Hereinafter, operation of the characteristic determination means 12 and the normalization processing means 13 will be explained with reference to FIG. 3.

Figure 3A:
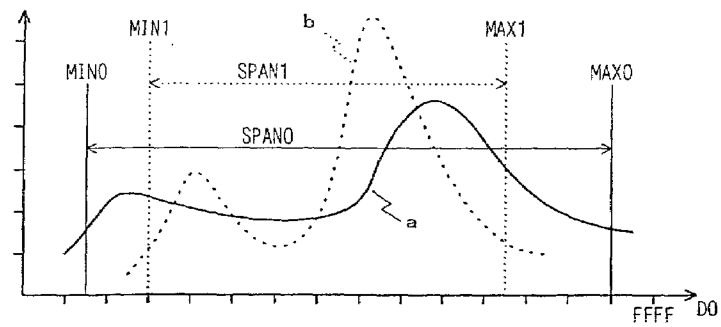

The characteristic determination means 12 finds a cumulative histogram of the image data D0*a*. FIG. 3A shows examples of the cumulative histogram found by the characteristic determination means 12. The cumulative histogram refers to a diagram having an abscissa representing data values for all image data comprising the radiation image and an ordinate representing frequency of the data values. The cumulative histogram is based on the image data D0*a* obtained by pre-reading. However, if the histogram is generated likewise based on the data obtained at the time of main reading, a result similar to a result of the histogram of the pre-reading data can be obtained, except for absolute values of the data. Therefore, determination of the normalization processing characteristic based on the cumulative histogram obtained by pre-reading does not cause a problem when used on the data in main reading.

In FIG. 3A, two histograms are shown by lines a and b. Let the line a be the cumulative histogram generated by the image data D0*a* representing the radiation image photographed under a predetermined condition, and let MAX0 and MIN0 be a maximum value and a minimum value respectively of a desired image information range of the image data D0*a* in FIG. 3A. A desired image information range SPAN0 falls between MIN0 and MAX0.

Let the line b be the cumulative histogram found based on the image data D0*a* representing an image photographed under a condition different from the previous condition. In this case, let MAX1 and MIN1 respectively be a maximum value and a minimum value of a desired image information range of the image data D0*a* in the latter case. The "condition different from the previous condition" refers to the case where a radiation dose is different or the case where another subject is photographed.

The characteristic determination means 12 causes the normalization processing means 13 to carry out image data conversion in such a manner that a displayed image represented by the 16-bit image data D0*a* in each case has adequate density or contrast (hereinafter called adequate density). More specifically, the maximum value MAX0 or MAX1 and the minimum value MIN0 or MIN1 in the respective desired image information ranges are converted so as to correspond to a maximum value MAX2 and to a minimum value MIN2 of the image data D1 in 12 bits.

Figure 3B:
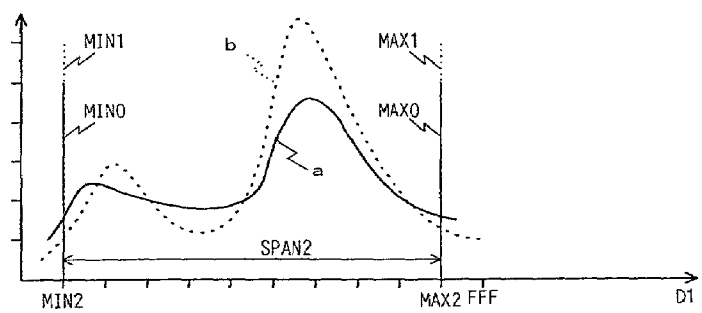

FIG. 3B shows cumulative histograms generated by converting the 16-bit image data D0*a* having the respective desired image information ranges MIN0~MAX0 and MIN1~MAX1 into the 12-bit image data D1 having the adequate density range MIN2~MAX2. The minimum values MIN0 and MIN1 and the maximum values MAX0 and MAX1 respectively correspond to MIN2 and MAX2. In this example, the 16-bit image data D0*a* are converted into the 12-bit image data D1 through normalization processing, and the normalization processing includes bit reduction processing. However, the normalization processing can be normalization processing not including the bit reduction processing, such as processing to convert the 16-bit image data D0*a* into the image data D1 in 16 bits. In the case where the normalization processing does not include the bit reduction processing, bit reduction processing to reduce the number of bits of the image data D1 after the normalization processing may be carried out. In other words, the 16-bit image data D1 are subjected to the bit reduction processing to generate the 12-bit image data as in the case described above.

As is obvious from FIG. 3B, when the normalization processing is carried out based on the normalization processing characteristic determined by the characteristic determination means 12, the 12-bit image data D1 always fall within the adequate density range MIN2~MAX2 even if the desired image information range of the 16-bit image data D0*a* becomes different.

Figure 3C:
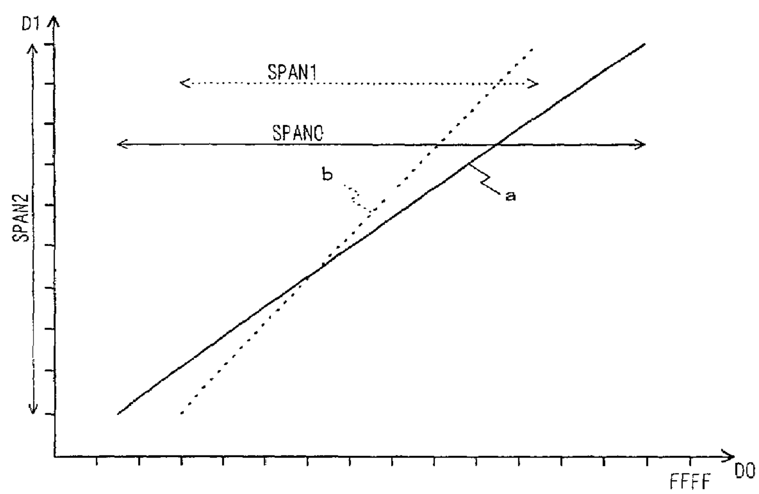

For converting the image data D0*a* representing each of the images of the different desired image information ranges into the 12-bit image data D1 having the adequate density range MIN2~MAX2, the input 16-bit image data D0*a* are converted into the output 12-bit image data D1 by using a predetermined conversion function as shown by a line a or b in FIG. 3C, for example. As the predetermined conversion function, either of the following functions is used in this example:

$$D1_a = D0a_a \times Gain_a + Offset_a$$

$$D1_b = D0a_b \times Gain_b + Offset_b$$

where $\mathbf{D1}_a$ and $\mathbf{D1}_b$ are data represented by the lines a and b in FIG. 3*c*, respectively.

The characteristic determination means 12 determines each of the conversion functions corresponding to the respective histograms as the normalization processing characteristic in each case, and inputs the normalization processing characteristic to the normalization processing means 13.

The normalization processing means 13 converts the image data D0 obtained by main reading based on the conversion function determined as the normalization processing characteristic.

As has been described above, according to the present invention, even if the desired image information range becomes different for the image data D0 obtained by main reading, optimal setting for the gains and the offsets (normalization processing) can be found. As a result, even if a low-bit AD converter is used (12 bits in this embodiment), the 12-bit image data D1 having the adequate density range MIN2~MAX2 can always be output from the normalization processing means 13. Therefore, when the image is displayed based on the image data D1 after the normalization processing, the density and the contrast thereof can be adequate. Furthermore, an effect caused by noise of an electric system can be reduced, and a problem of radiation image quality degradation can be avoided.

Moreover, since the normalization processing characteristic is determined by carrying out pre-reading, time between main reading and image reproduction can be shortened compared to the case where the normalization processing characteristic is determined after main reading.

Upon conversion to the 12-bit image data D1 having the adequate density range MIN2~MAX2, not only a conversion function represented by a line (linear function) as in the above example but also a conversion function of higher degrees such as a cubic function can be used.

A plurality of probable histograms and look-up tables LUT corresponding to the respective histograms may be prepared so that one of the look-up tables corresponding to a histogram most similar to the histogram of the image data can be determined as the normalization processing characteristic. In this case, the image data are converted by the normalization processing means 13 based on the LUT.

Taking a saturation characteristic of the solid-state detecting devices, such as a fact that the devices have a low saturation level, into consideration, the normalization processing characteristic is preferably determined based on information on saturation of the devices, such as a ratio of saturated pixels to all pixels and position information thereof. For example, in order to find the ratio of the saturated pixels, a ratio of pixels at a saturation level (such as pixels whose image data D0*a* are close to FFFF) is found by using the cumulative histogram described above. The position information can be found from positions of the pixels at the saturation level.

Figure 4:
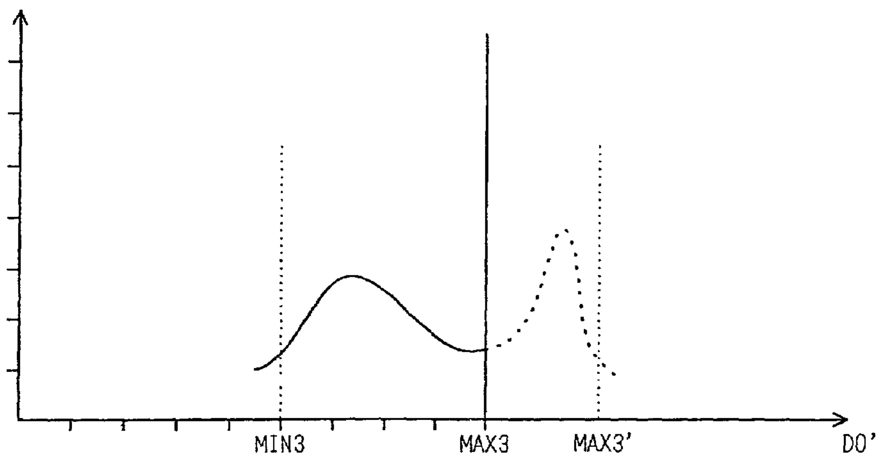
FIG. 4 shows an example of a cumulative histogram in the case where saturated pixels exist.

In order to detect whether the output signal from the devices is saturated, the following method can be used, for example. First, the image data D0*a* are reduced. Based on the reduced image data, the cumulative histogram is found as has been described above. In the case where a ratio of pixels having frequency corresponding to a minimum value and a maximum value of a quantization range of the reduced image data to all pixels in the reduced image becomes equal to or exceeds a predetermined threshold value, the image is judged to be partially saturated. For example, if the output signal from the solid-state detecting devices is saturated, the image data are saturated on the side of a high signal value. Therefore, the cumulative histogram based on the reduced image data in 10 bits has a peak near a maximum value MAX3 (whose data value is 3FF in this example) of the image data, as shown in FIG. 4. When the peak value is equal to or larger than a predetermined threshold value, the image is judged to be partially saturated.

In the case where the image has been judged to be partially saturated, the normalization processing is not carried out to cause an image information range MIN3~MAX3 to become the adequate density range MIN2~MAX2, unlike the example described above. In this case, the normalization processing characteristic is determined so as to cause an image information range MIN3~MAX3 ' to correspond to the adequate density range MIN2~MAX2 . The value MAX3' is found by adding an assumed histogram width CW (constant) to MAX3. By using the normalization processing characteristic determined in the above manner, the normalization processing is carried out.

The normalization processing characteristic may be determined by using another method. For example, the normalization processing characteristic is temporarily determined according to the method described above. The normalization processing characteristic is then determined so as to adjust the density or the contrast according to the ratio of the saturated pixels. More specifically, if the pixels are saturated on the high-density side, the normalization processing characteristic is determined so as to cause the density and the contrast to decrease. A degree of adjustment in this case is set according to a degree of saturation.

Furthermore, as shown by the dashed line in FIG. 1, the data range determination means 14 may be used for determining the desired image data range which represents the range of the image data representing the desired image information range in the image information. The normalization processing characteristic is determined based on a portion of the image data corresponding to the desired image data range (such as within a radiation field) detected by the data range determination means 14 in the cumulative histogram obtained by the characteristic determination means 12. In this manner, the normalization processing characteristic is determined more adequately based on the image data in the range effective as the image information. As a result, the normalization processing can be carried out more adequately.

As the data range determination means 14, means for determining the desired image data range as data in a radiation field detected by using radiation field detection means adopting radiation field recognition processing of any known method, such as methods described in Japanese Unexamined Patent Publication Nos. 61(1986)-39039, 61(1986)-170178, and 63(1988)-259538, may be used. Alternatively, means for detecting an edge portion of a subject image, such as means described in Japanese Unexamined Patent Publication No. 4(1992)-11242, may be used so that data within the detected edge portion are used as the desired image data range. Furthermore, means for detecting a cervical vertebra portion and a soft tissue portion or the like in a subject image for example, such as means described in Japanese Unexamined Patent Publication No. 1(1989)-50171, may be used so that the desired image data range can be determined based on a result of the detection by the means.

The preferred embodiment of the image information reading method and the image information reading apparatus of the present invention has been described above. However, the present invention is not limited to the embodiment described above. For example, the detector 10 in the above embodiment is of TFT reading type. However, the detector 10 may be of optical reading type.

In the case where pre-reading is carried out by using an optical reading type detector, it is preferable for the reduction in the image signal component at the time of main reading to be equal to or less than 30%. More preferably, the reduction is equal to or less than 10%. Energy of the reading light per unit area is also reduced more in pre-reading than in main reading.

Figure 5:
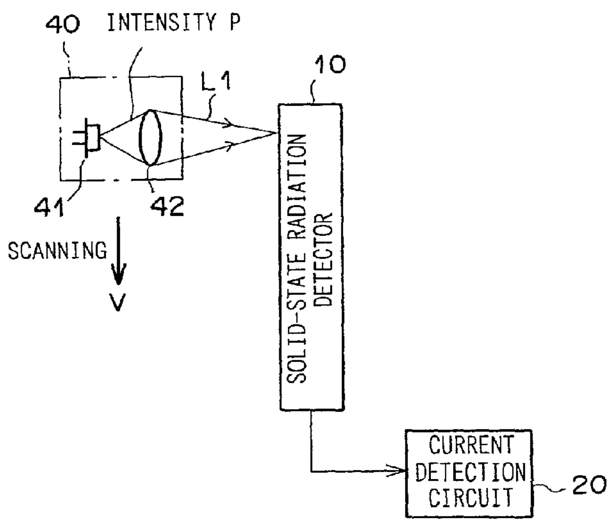
FIG. 5 explains a method using a predetermined amount as a reduction in an image signal component at the time of main reading, in the case where an optical reading type detector is used.

More specifically, as shown in FIG. 5, in a reading light scanning optical system 40 comprising a light source 41 for emitting reading light L1 and light focusing means 42 for focusing the reading light L1 on the detector 10, intensity (power) P1 of the reading light L1 in pre-reading is reduced compared to intensity P2 of the reading light L1 in main reading (P1<P2). Alternatively, a scanning speed V1 of the reading light L1 may be increased in pre-reading compared to a scanning speed V2 of the reading light L1 in main reading (V1>V2), in order to carry out the pre-reading quickly.

Figure 6:
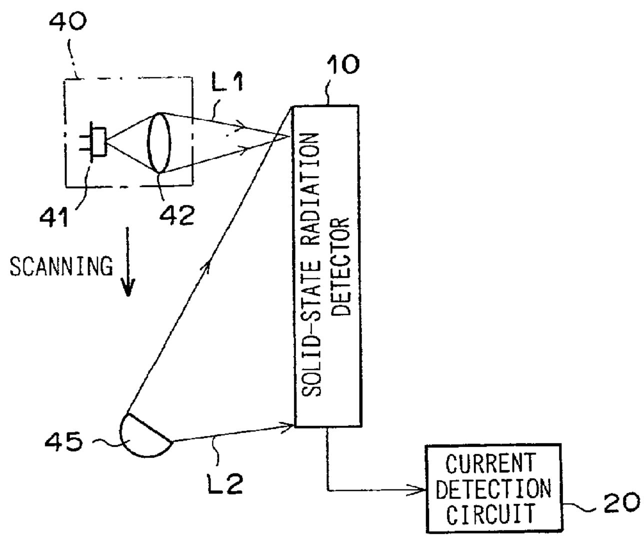
FIG. 6 explains a method of reducing processing time in main reading in the case where an optical reading type detector is used.

Moreover, in order to shorten processing time for pre-reading, a uniform exposure optical system 45 may be used in addition to the reading light scanning optical system 40, as shown in FIG. 6. In this case, uniform exposure is carried out and reading light L2 for pre-exposure is irradiated over an entire surface of the detector 10 at once. The reading light L2 for pre-exposure is set weak or irradiation time thereof is set short so that the reduction becomes 30% or less, or more preferably 10% or less. An optical system serving as both the reading light scanning optical system 40 and the uniform exposure optical system 45 may also be used.

In the case where uniform exposure is carried out, a signal electric current is collectively output from the detector 10 and the pre-reading signal is obtained as compressed information. In the case where a detector having a stripe electrode comprising linear electrodes laid out at intervals of pixel pitch, such as a detector proposed by the applicant in Japanese Patent Application Nos. 10(1998)-271374 and 11(1999)-87922, is used, one-dimensional compressed information is obtained as the pre-reading signal for each of the linear electrodes, which is sufficient for normalization processing.

A method combining the method using the predetermined amount as the reduction as shown in FIG. 5 and the method of reducing the pre-reading processing time as shown in FIG. 6 may also be used.

Setting of the intensity or the scanning speed of the reading light for controlling the reduction or control of the uniform exposure is carried out by an instruction from the control means 30.

What is claimed is:

1. A method of reading image information by using an image detector enabling recording of the image information by storing an electric charge obtained by detecting an electromagnetic wave representing the image information, the image information reading method comprising the step of carrying out main reading for reading the image information by obtaining an electric signal in accordance with an amount of electric charge stored in the image detector, the image information reading method further comprising the steps of:

carrying out pre-reading prior to the main reading; analyzing the electric signal obtained by the pre-reading; determining a normalization processing characteristic used for carrying out normalization processing on the electric signal obtained by the main reading; and carrying out the normalization processing on the electric signal obtained by the main reading, based on the normalization processing characteristic that has been determined, wherein, in the pre-reading, some of the electric charges to be read out during the main-reading are read out.

2. An image information reading method as defined in claim 1, wherein a reduction in the electric signal in the main reading caused by the pre-reading is suppressed to 30% or less.

3. An image information reading method as defined in claim 2, wherein the reduction is suppressed to 10% or less.

4. An image information reading method as defined in claim 2 or 3, wherein the image detector is of optical reading type and the pre-reading is carried out by using reading light whose irradiation energy per unit area of the image detector is smaller than the irradiation energy in the main reading.

5. An image information reading method as defined in claim 4, wherein the irradiation energy in the pre-reading is reduced by, decreasing irradiation intensity of the reading light.

6. An image information reading method as defined in claim 4, wherein the irradiation energy in the pre-reading is reduced by increasing a scanning speed of the reading light.

7. An image information reading method as defined in any one of claims 1 to 3, wherein the image detector is of optical reading type and the pre-reading is carried out by using reading light enabling irradiation on an entire surface of the image detector at once.

8. An image information reading method as defined in claim 2 or 3, wherein the image detector is of TFT reading type and the pre-reading is carried out by causing ON time of TFTs in the pre-reading to be shorter than the ON time in the main reading.

9. An image information reading method as defined in any one of claims 1 to 3, wherein a TFT reading type image detector is used as the image detector and the pre-reading is carried out by binning reading.

10. An image information reading apparatus comprising an image detector enabling recording of image information by storing an electric charge obtained by detecting an electromagnetic wave representing the image information, and signal acquisition means for obtaining an electric signal in accordance with an amount of the electric charge stored in the image detector, the image information reading apparatus further comprising:

control means for controlling switching between main reading in which the image information is read and pre-reading for obtaining the electric signal carried out prior to the main reading, wherein, in the pre-reading, some of the electric charges to be read out during the main-reading are read out;

characteristic determination means for determining a normalization processing characteristic used at the time of carrying out normalization processing on the electric signal obtained by the main reading, by analyzing the electric signal obtained by the pre-reading; and normalization processing means for carrying out the normalization processing on the electric signal obtained by the main reading, based on the normalization processing characteristic that has been determined.

11. An image information reading apparatus as defined in claim 10, wherein the control means controls a reduction in the electric signal in the main reading caused by the pre-reading to be 30% or less.

12. An image information reading apparatus as defined in claim 11, wherein the control means controls the reduction to be 10% or less.

13. An image information reading apparatus as defined in claim 11 or 12, wherein the image detector is of optical reading type and the control means causes the pre-reading to be carried out by using reading light whose irradiation energy per unit area of the image detector is smaller in the pre-reading than in the main reading.

14. An image information reading apparatus as defined in claim 13, wherein the control means lowers the irradiation energy in the pre-reading by reducing irradiation intensity of the reading light.

15. An image information reading apparatus as defined in claim 13, wherein the control means reduces the irradiation energy in the pre-reading by increasing a scanning speed of the reading light.

16. An image information reading apparatus as defined in any one of claims 10 to 12, wherein the image detector is of optical reading type and the control means causes the pre-reading to be carried out by using reading light enabling irradiation over an entire surface of the image detector at once.

17. An image information reading apparatus as defined in claim 11 or 12, wherein the image detector is of TFT reading type and the control means causes the pre-reading to be carried out in such a manner that ON time of TFTs in the pre-reading becomes shorter than the ON time in the main reading.

18. An image information reading apparatus as defined in any one of claims 10 to 12, wherein the image detector is of TFT reading type and the control means causes the pre-reading to be carried out by using binning reading.

19. A method of reading image information by using an image detector enabling recording of the image information by storing an electric charge obtained by detecting an electromagnetic wave representing the image information, the image information reading method comprising:

pre-reading the image information by obtaining an electric signal in accordance with an amount of electric charge stored in the image detector;

determining a normalization processing characteristic by analyzing the electric signal obtained by the pre-reading;

main-reading the image information by obtaining an electric signal in accordance with an amount of electric charge stored in the image detector; and performing normalization processing on the electric signal obtained by the main reading, based on the determined normalization processing characteristic.

20. The method according to claim 19, wherein the image detector is an optical reading device and the pre-reading is performed by using at least one of: light with irradiation energy per unit area of the image detector being smaller than the irradiation energy in the main reading and using reading light enabling simultaneous irradiation of an entire surface of the image detector.

21. The method according to claim 19, wherein the image detector is a TFT type reading device and the pre-reading is carried out by at least one of: causing ON time of TFTs in the pre-reading to be shorter than the ON time in the main reading and binning reading.

22. A method of reading image information by using an image detector enabling recording of the image information by storing an electric charge obtained by detecting an electromagnetic wave representing the image information, the image information reading method comprising:

carrying out main reading for reading the image information by obtaining an electric signal in accordance with an amount of electric charge stored in the image detector;

carrying out pre-reading;

analyzing the electric signal obtained by the pre-reading; and determining a normalization processing characteristic used for carrying out normalization processing on the electric signal obtained by the main reading, wherein a reduction in the electric signal in the main reading caused by the pre-reading is suppressed to 30% or less.

23. An image information reading apparatus comprising:

an image detector enabling recording of image information by storing an electric charge obtained by detecting an electromagnetic wave representing the image information;

a signal acquisition means for obtaining an electric signal in accordance with an amount of the electric charge stored in the image detector;

control means for controlling switching between main reading in which the image information is read and pre-reading for obtaining the electric signal; and characteristic determination means for determining a normalization processing characteristic used at the time of carrying out normalization processing on the electric signal obtained by the main reading, by analyzing the electric signal obtained by the pre-reading, wherein the control means controls a reduction in the electric signal in the main reading caused by the pre-reading to be 30% or less.

* * * * *